(12) United States Patent
Yambal et al.

(10) Patent No.: US 9,092,785 B2
(45) Date of Patent: Jul. 28, 2015

(54) ACCESS CHANNEL DEFINITION TECHNOLOGY

(75) Inventors: Sachin Yambal, Bangalore (IN); Rajesh Pralhadrao Mahalle, Pune (IN); Jitendra Javerchand Jain, Pune (IN)

(73) Assignee: Accenture Global Services Limited, Dublin (IE)

( * ) Notice: Subject to any disclaimer, the term of this patent is extended or adjusted under 35 U.S.C. 154(b) by 517 days.

(21) Appl. No.: 12/828,825

(22) Filed: Jul. 1, 2010

(65) Prior Publication Data
US 2011/0276893 A1    Nov. 10, 2011

(30) Foreign Application Priority Data
May 10, 2010 (IN) .............................. 1308CHE2010

(51) Int. Cl.
*G06F 17/30* (2006.01)
*G06Q 30/00* (2012.01)

(52) U.S. Cl.
CPC ............ *G06Q 30/01* (2013.01); *G06F 17/3089* (2013.01); *G06F 17/30893* (2013.01)

(58) Field of Classification Search
CPC ................ G06F 17/30905; G06F 17/30873; G06F 17/30893; G06F 17/3089; H04L 29/0809; H04N 21/2358; H04N 21/4358; H04N 21/4622; G06Q 30/01
USPC ........................................................ 715/745
See application file for complete search history.

(56) References Cited

U.S. PATENT DOCUMENTS 6,697,825 B1 * 2/2004 Underwood et al. ......... 715/207
7,353,452 B2 * 4/2008 Boehme et al. .............. 715/251
7,694,000 B2 * 4/2010 Flores et al. .................. 709/228
2003/0023755 A1   1/2003 Harris et al.
2003/0158969 A1   8/2003 Gimson et al.
2007/0239726 A1 * 10/2007 Weiss et al. .................... 707/10

(Continued)

FOREIGN PATENT DOCUMENTS

EP            1947575 A1     7/2008

OTHER PUBLICATIONS

Glaser. Internet Protocol Television: What is IPTV and Why Should Real Estate Developers and Home Builders Be Interested in IPTV? Archived from http://telecomattoneys.com/IPTV.html on Jan. 18, 2008, Accessed Sep. 6, 2012.*

(Continued)

*Primary Examiner* — Amy M Levy
(74) *Attorney, Agent, or Firm* — Fish & Richardson P.C.

(57) ABSTRACT

Access channel definition technology, in which a user experience for a secondary access channel is defined using one or more pre-configured user experience components that enable mapping of a user experience defined for a primary access channel to the user experience for the secondary access channel and that adapt the user experience for the secondary access channel to characteristics of devices that access the secondary access channel. In addition, a portal for the secondary access channel is defined using one or more pre-configured portal components and content management for the secondary access channel is defined using one or more pre-configured content management components that leverage content developed for the primary access channel and that customize presentation of the content for the secondary access channel. The secondary access channel is configured based on the defined user experience, the defined portal, and the defined content management.

15 Claims, 14 Drawing Sheets

(56) References Cited

U.S. PATENT DOCUMENTS

| | | | | |
|---|---|---|---|---|
| 2008/0033997 | A1* | 2/2008 | Banker | 707/104.1 |
| 2008/0176544 | A1 | 7/2008 | Holdsworth | |
| 2008/0306883 | A1* | 12/2008 | Baffier et al. | 705/400 |
| 2009/0319672 | A1* | 12/2009 | Reisman | 709/227 |
| 2011/0289317 | A1* | 11/2011 | Darapu et al. | 713/168 |

OTHER PUBLICATIONS

Simpson et al. IPTV and Internet Video: Expanding the Reach of Television Broadcasting 2nd edition. 2009. Elsevier. 242 pages.*

Ma et al. A framework for adaptive content delivery in heterogeneous network environments. IS&T/SPIE Conference on Multimedia Computing and Networking 2000, SPIE vol. 3969, San Jose, California, Jan. 1, 2000. pp. 86-100.*

European Search Report issued in Application No. EP 10 00 7158, mailed Oct. 10, 2010, 8 pages.

Wei-Ying Ma et al., 'A framework for adaptive content delivery in heterogenous network environments', Part of the IS&T/SPIE Conference on Multimedia Computing and Networking 2000, SPIE vol. 3969, San Jose, California, Jan. 2000, 15 pages.

Australian Patent Examination Report No. 1 for Application No. 2010202888 dated Aug. 19, 2013, 3 pages.

European Office Action for Application No. 10007158.8-1955 dated Aug. 26, 2013, 10 pages.

Australian Patent Examination Report No. 2 for Application No. 2010202888 dated May 27, 2014, 4 pages.

Australian Patent Examination Report No. 3 for Application No. 2010202888 dated Oct. 16, 2014, 3 pages.

Summons to Attend Oral Proceedings issued in EP Application No. 10007158.8, dated Apr. 7, 2015, 12 pages.

* cited by examiner

ACCESS CHANNEL DEFINITION TECHNOLOGY

CROSS REFERENCE TO RELATED APPLICATIONS

The present application claims the benefit of Indian Patent Application No. 1308/CHE/2010, filed on May 10, 2010, which is incorporated herein by reference in its entirety for all purposes.

The present disclosure generally relates to access channel definition technology.

BACKGROUND

Content providers provide electronic content through various types of access channels. Each access channel may have its own protocol and requirements for providing electronic content effectively. Accordingly, when a content provider desires to begin offering content through another access channel or new access channel technology is developed, the content provider adapts its existing infrastructure or builds new infrastructure to support the protocol and requirements of the additional access channel.

SUMMARY

In one aspect, a computer system includes at least one processor and at least one memory unit coupled to the at least one processor having stored thereon one or more pre-configured user experience components that enable mapping of a user experience defined for a primary access channel to a user experience for a secondary access channel and that adapt the user experience for the secondary access channel to characteristics of devices that access the secondary access channel. The at least one memory unit also stores one or more pre-configured portal components and one or more pre-configured content management components that leverage content developed for the primary access channel and that customize presentation of the content for the secondary access channel. The at least one memory unit further stores instructions which, when executed by the at least one processor, cause the at least one processor to perform operations that include defining a user experience for the secondary access channel using the one or more pre-configured user experience components and defining a portal for the secondary access channel using the one or more pre-configured portal components. In addition, the operations include defining content management for the secondary access channel using the one or more pre-configured content management components and configuring the secondary access channel based on the defined user experience for the secondary access channel, the defined portal for the secondary access channel, and the defined content management for the secondary access channel.

Implementations may include one or more of the following features. For example, the operations may include mapping a primary access channel user experience to a secondary access channel user experience. The operations also may include defining a device independent user experience for the secondary access channel that defines user experience for the secondary access channel in a manner that is independent of a type of device a user uses to access the secondary access channel. The device independent user experience may be configured to be leveraged to provide a consistent user experience across multiple, different types of devices.

In some implementations, the operations may include defining a device type specific user experience for the secondary access channel that defines user experience for the secondary access channel in a manner that is specific to a particular type of device a user uses to access the secondary access channel. The device type specific user experience may be configured to be leveraged to provide a user experience when a user uses the particular type of device to access the secondary access channel. Further, the operations may include defining a portal for the secondary access channel using one or more pre-configured portal components that migrate at least one portal component defined for the primary access channel to at least one portal component for the secondary access channel.

In some examples, the operations may include migrating at least one portal component defined for the primary access channel to at least one portal component for the secondary access channel using a ready to use portal component for the secondary access channel. In these examples, the operations may include receiving input selecting, from among multiple portal components defined for the primary access channel, a subset of the multiple portal components to include in the secondary access channel and, based on the selection of the subset of the multiple portal components to include in the secondary access channel, migrating the subset of the multiple portal components to the secondary access channel such that the secondary access channel includes less than all of the multiple portal components defined for the primary access channel.

In addition, the operations may include receiving selection of a first portal component defined for the primary access channel to include in the secondary access channel and receiving selection of a second portal component defined for the primary access channel to include in the secondary access channel. The second portal component may be different than the first portal component. Based on the selection of the first portal component and the second portal component, the first portal component defined for the primary access channel and the second portal component defined for the primary access channel may be integrated in the portal for the secondary access channel.

The operations may include defining a preload notice for the secondary access channel using a pre-configured custom preload notice. The operations also may include defining device type specific conversion functionality using pre-configured device policies to enable conversion of content provided over the secondary access channel to account for characteristics of a type of device accessing the secondary access channel. The operations further may include defining at least one presentation template for the secondary access channel using a pre-configured presentation template for the secondary access channel. In addition, the operations may include defining at least one authoring template for the secondary access channel by updating an existing authoring template for the primary access channel. Also, the operations may include updating content publishing mechanisms to accommodate the secondary access channel such that content made available through the primary access channel is also made available through the secondary access channel.

In some examples, the operations may include accessing data defining user experience, portal, and content management for the primary access channel and analyzing the data defining the user experience, the portal, and the content management for the primary access channel to identify aspects of the user experience, the portal, and the content management for the primary access channel that are appropriate for the secondary access channel and that are inappropriate for the secondary access channel. In these examples, the operations may include determining a recommendation for migrating the primary access channel to the secondary access channel based on the identified aspects of the user experience, the portal, and the content management for the primary access channel that are appropriate for the secondary access channel and that are inappropriate for the secondary access channel and outputting the recommendation to assist a user in defining the secondary access channel by leveraging the primary access channel.

In some implementations, the operations may include receiving user input selecting user experience attributes from one or more pre-configured user experience components and storing, in electronic storage, the selected user experience attributes. In these implementations, the operations may include receiving user input selecting portal attributes from one or more pre-configured portal components and storing, in electronic storage, the selected portal attributes. Further, in these implementations, the operations may include receiving user input selecting content management attributes from one or more pre-configured content management components and storing, in electronic storage, the selected content management attributes. In addition, the operations may include defining a user experience for a secondary access channel using one or more pre-configured user experience components that enable mapping of a user experience of a preexisting primary access channel to the user experience for the secondary access channel.

In some examples, the operations may include defining a user experience for a mobile channel using one or more pre-configured user experience components that enable mapping of a user experience defined for a web channel to the user experience for the mobile channel and defining the portal for the mobile channel using one or more pre-configured portal components. In these examples, the operations may include defining content management for the mobile channel using one or more pre-configured content management components that leverage content developed for the web channel and that customize presentation of the content for the mobile channel and configuring the mobile channel.

In some implementations, the operations may include defining a user experience for an Internet protocol television channel using one or more pre-configured user experience components that enable mapping of a user experience defined for a web channel to the user experience for the Internet protocol television channel and defining the portal for the Internet protocol television channel using one or more pre-configured portal components. In these implementations, the operations may include defining content management for the Internet protocol television channel using one or more pre-configured content management components that leverage content developed for the web channel and that customize presentation of the content for the Internet protocol television channel and configuring the Internet protocol television channel.

In another aspect, a computer-implemented method of defining a secondary access channel by leveraging a primary access channel includes defining, by a computer system, a user experience for a secondary access channel using one or more pre-configured user experience components that enable mapping of a user experience defined for a primary access channel to the user experience for the secondary access channel and that adapt the user experience for the secondary access channel to characteristics of devices that access the secondary access channel. The method also includes defining, by the computer system, a portal for the secondary access channel using one or more pre-configured portal components and defining, by the computer system, content management for the secondary access channel using one or more pre-configured content management components that leverage content developed for the primary access channel and that customize presentation of the content for the secondary access channel. The method further includes configuring, by the computer system, the secondary access channel based on the defined user experience for the secondary access channel, the defined portal for the secondary access channel, and the defined content management for the secondary access channel.

In yet another aspect, at least one computer-readable storage medium is encoded with executable instructions that, when executed by at least one processor, cause the at least one processor to perform operations. The operations include defining a user experience for a secondary access channel using one or more pre-configured user experience components that enable mapping of a user experience defined for a primary access channel to the user experience for the secondary access channel and that adapt the user experience for the secondary access channel to characteristics of devices that access the secondary access channel. The operations also include defining a portal for the secondary access channel using one or more pre-configured portal components and defining content management for the secondary access channel using one or more pre-configured content management components that leverage content developed for the primary access channel and that customize presentation of the content for the secondary access channel. The operations further include configuring the secondary access channel based on the defined user experience for the secondary access channel, the defined portal for the secondary access channel, and the defined content management for the secondary access channel.

The details of one or more implementations are set forth in the accompanying drawings and the description, below. Other potential features and advantages of the disclosure will be apparent from the description and drawings, and from the claims.

DETAILED DESCRIPTION

In some implementations, a framework is provided for adding multiple channels to web portals. In these implementations, the framework addresses multi-channel portal implementation by providing different components which cut across building blocks of portal development. The framework exists across different portal servers, which provide strategy for creating a multi-channel portal from an existing web portal. The framework is portal technology agnostic and supports different mobile channels, as well as television (e.g., internet-based television) channels and kiosk channels. The framework is configured to add the additional channel by leveraging design characteristics of the existing channel without making changes to the existing channel.

In some examples, the framework provides multiple components for enterprise portal projects. These framework components can be used in business scenarios where a customer wants to develop a new portal that supports multiple channels, as well as business scenarios where a customer wants to add a mobile channel on top of an existing web channel. The framework components are divided into user experience components, portal components, and content management system components. The framework components are configured for a multi channel portal server and support mobile devices/mobile channels, as well as other types of channels. The framework may assist users in leveraging an existing channel to expand to a multi-channel portal in a manner that is efficient and cost effective. The framework also may enable provision of a consistent content experience for users accessing content through any of the multiple channels.

Figure 1:
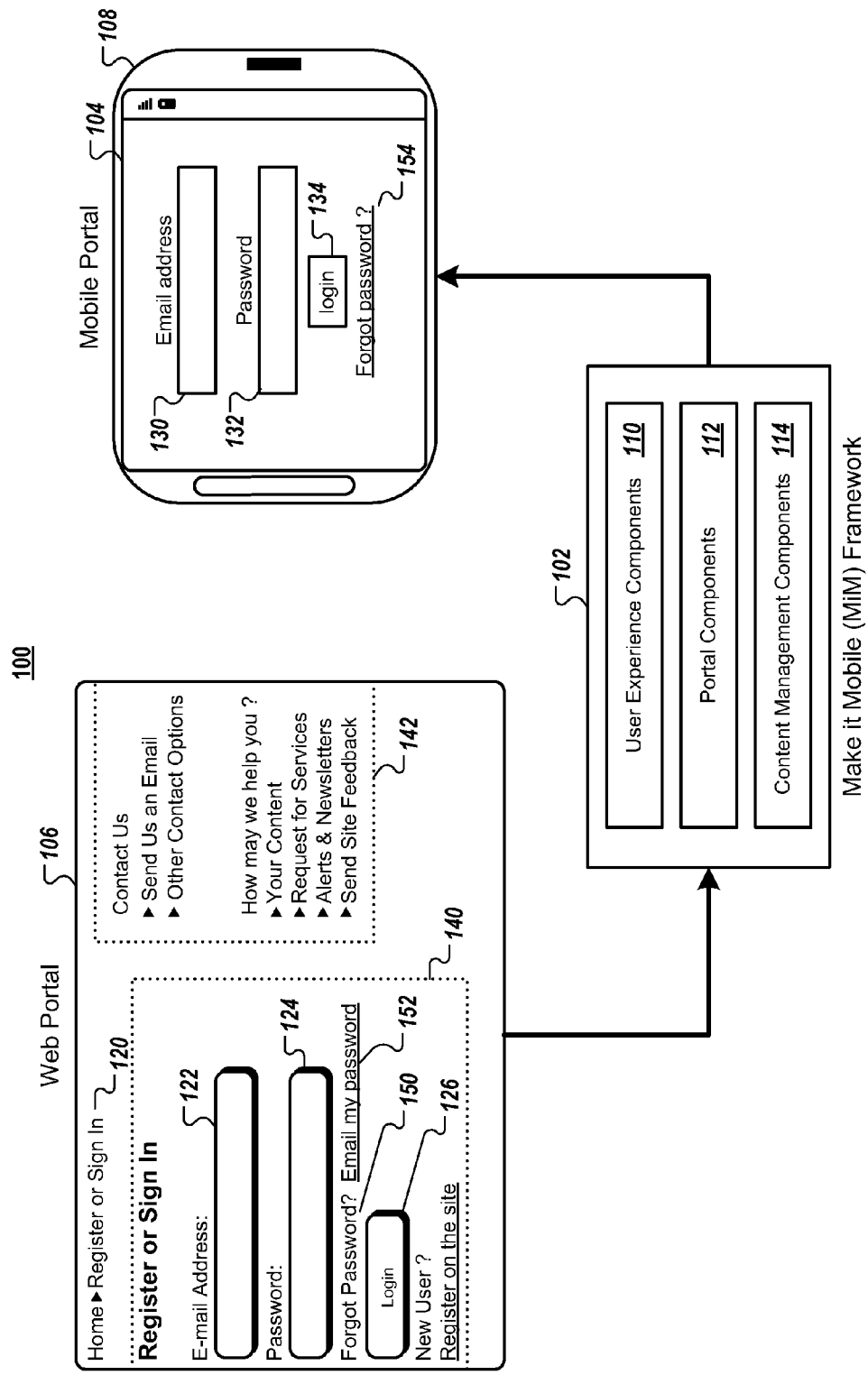
FIGS. 1, 3, 13, and 14 are diagrams of exemplary systems.

FIG. 1 illustrates a system 100 for defining a secondary access channel. The system 100 includes a framework 102 which may be used for defining a secondary access channel, such as a mobile channel, by leveraging a primary access channel, such as a web channel. For example, a mobile channel accessible from a mobile portal 104 may be defined by leveraging a web channel accessible from a web portal 106. The mobile portal 104 may be accessed, for example, using a mobile device 108. The web portal 106 may be accessed, for example, using a web browser operating on a personal computer.

The framework 102 may be used to migrate an existing application initially developed for one access channel (e.g., web) to a second access channel, such as a mobile channel. The framework 102 also may be used to assist in development of a new application, when it is desired to have the application made available to users on multiple access channels (e.g., on both web and mobile channels). For instance, when developing a new application, a developer may define a new first access channel (e.g., a new web channel) and then use the framework 102 to develop a new second access channel (e.g., a new mobile channel) that leverages the prior design of the new first access channel.

The framework 102 may be used to define multiple secondary access channels based on a primary access channel. For example, in addition to the mobile channel displayed on the mobile device 108, other mobile channels may be defined, based on the web channel displayed in the web portal 106, for display on other mobile devices which have different functionality than the mobile device 108, such as a different screen size, different color or other display characteristics, different input capabilities or different audio or video capabilities. Other example secondary access channels may include a channel defined for display on a kiosk, or a channel defined for display on IPTV (Internet Protocol TeleVision).

The framework 102 includes user experience framework components 110, portal framework components 112, and content management framework components 114. The user experience framework components 110 enable mapping of a user experience defined for a primary access channel to a user experience for a secondary access channel. The user experience framework components 110 may be used to adapt the user experience for the secondary access channel to characteristics of devices that access the secondary access channel. For example, menus and other navigation approaches, layouts, branding, skins, and other user interface themes used in the web channel displayed on the web portal 106 may be adapted for the mobile channel displayed on the mobile portal 104. For example, interfaces defined for a web channel may use navigation approaches such as using a top menu bar 120, whereas a top menu may be omitted for interfaces defined for a mobile channel, due to lack of screen space on mobile devices such as the mobile device 108.

As another example, the web portal 106 may include user interface controls, such as controls 122, 124, and 126, which may be displayed in a three-dimensional, colored theme, and corresponding adapted controls, such as controls 130, 132, and 134, which have a more simple appearance, and which may be included in the mobile portal 104. The user experience framework components 110 may include pre-configured software components, and also may include process components such as guidelines, questionnaires, checklists, and best practice recommendations. User experience framework components are described in more detail below with respect to FIGS. 2, 5, and 6.

The portal framework components 112 may be used to define a portal for a secondary access channel. For example, the mobile portal 104 may be defined by migrating one or more portal components included in the web portal 106. The portal framework components 112 may include one or more portlets. A portlet is a region of a user interface which may be used to display information or offer a service. The portal framework components 112 may include, for example, software portlet components developed for display on a secondary access channel, such as on the mobile device 108.

The portal framework components 112 also may include guidelines for migrating a portlet used in a primary access channel to a portlet to be used in a secondary access channel. For example, the web portal 106 includes a login portlet 140 and a contact portlet 142 (the dotted lines are for illustration and would not normally be displayed in the web portal 106). The mobile portal 104 may be defined by migrating some or all of the portlets used in the web portal 106. For example, the mobile portal 104 displays an adapted version of the login portlet 140, but does not display a contact portlet.

A portlet may be adapted for use in a secondary access channel. For example, as shown, a text label 150 and a link 152 included in the login portlet 140 displayed on the web portal 106 have been combined into a single link 154 for display in the mobile portal 104. Portal framework components are described in more detail below with respect to FIGS. 2, 7, and 8.

The content management framework components 114 may be used to define content management for the secondary access channel by leveraging content developed for the primary access channel and customizing presentation of the content on the secondary access channel. For example, the content management framework components 114 may include one or more presentation templates defined for the secondary access channel. As another example, the content framework components 114 may include one or more authoring templates which may be based on authoring templates defined for the primary access channel. Content management framework components are described in more detail below with respect to FIGS. 2, 9, and 10.

Figure 2:
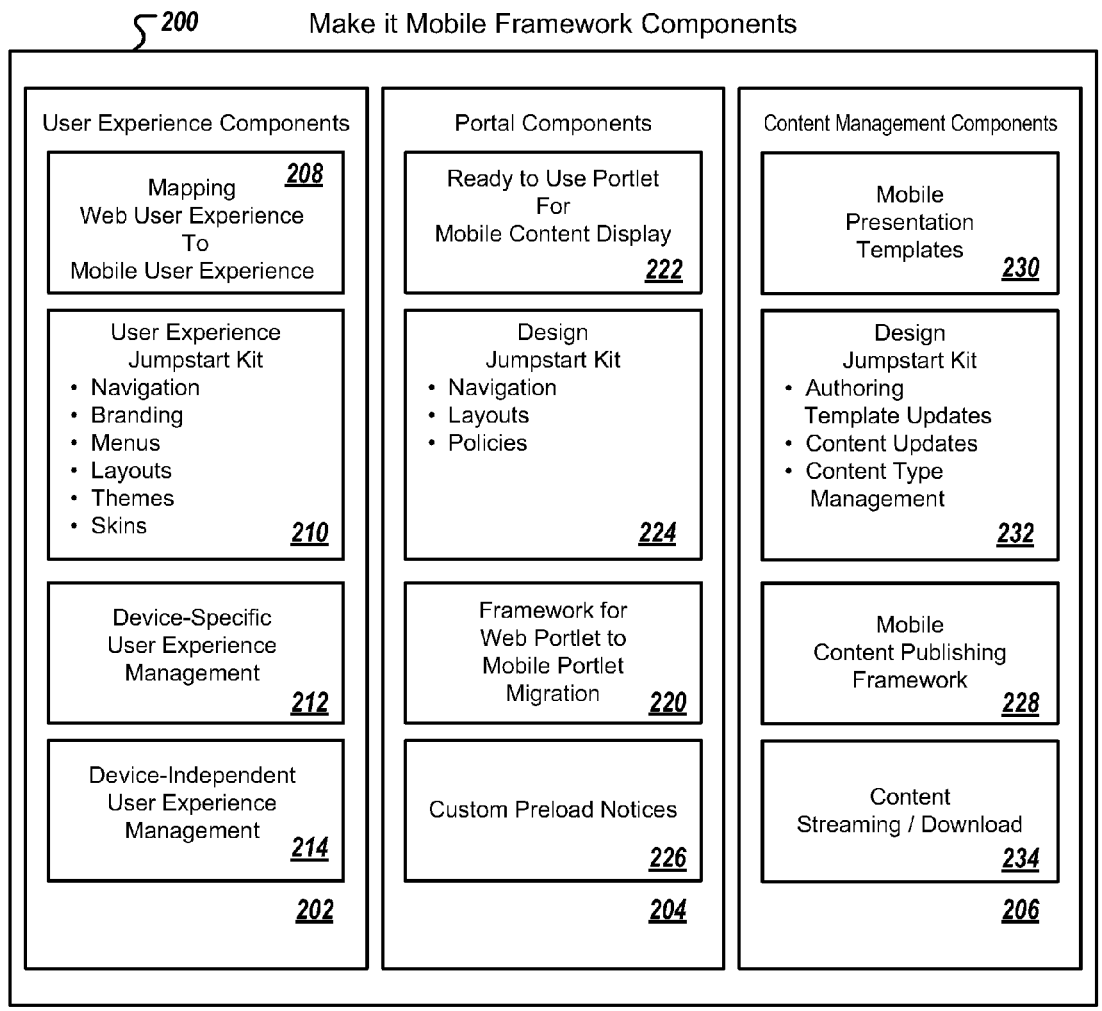
FIGS. 2, 6, 8, and 10 are diagrams of exemplary framework components.

FIG. 2 illustrates example framework components 200. The framework components 200 include user experience framework components 202, portal framework components 204, and content management framework components 206. The user experience components 202 include components 208 for mapping a user experience for a primary access channel (e.g., web) to a user experience for a secondary access channel (e.g., mobile). In further detail, the user experience components 202 include a user experience "jumpstart kit" 210 which enables mapping of primary access channel user experience components, such as navigation, branding, menus, and layouts, to corresponding secondary access channel user experience components. The user experience components 202 also include components 212 for managing a device-specific user experience and components 214 for managing a device-independent user experience.

The components 212 for managing a device-specific user experience may be leveraged to provide a specific user experience when a user uses a particular type of device to access the secondary access channel. The specific user experience may account for the characteristics and functionality of the particular type of device to take advantage of the features of the particular type of device (or accommodate for the limitations of the particular type of device) and provide a preferred user experience for users having the particular type of device.

The components 214 for managing a device-independent user experience may be leveraged to provide a consistent user experience across multiple, different types of devices. The consistent user experience may be used when a device-specific user experience has not been defined for the type of device accessing the secondary access channel or the type of device is unknown. The components 214 for managing a device-independent user experience also may define attributes of a user experience (e.g., colors) that are common across all devices, regardless of specific device features or characteristics. The common user experience attributes may be referenced when implementing device-specific user experiences to provide a consistent user experience for the common attributes that are not impacted by differing device features or characteristics.

The portal framework components 204 include components 220 for migrating portlets used for a primary access channel (e.g., web portlets) to portlets used for a secondary access channel (e.g., mobile portlets). The portal framework components 204 may include one or more ready to use portlets 222 (e.g., mobile portlets) for use in displaying content on a secondary access channel (e.g., mobile access channel). The portal framework components 204 also include a design "jumpstart kit" 224, which may include, for example, guidelines, recommendations, and best practices for portal navigation and layout of portlets on a portal, as well as one or more policies. For example, a device policy may describe a collection of attributes associated with a class of devices or a specific device. The portal framework components 204 also may include one or more custom preload notices 226. A preload notice may be, for example, a portlet which is used to display information before a requested portlet or page is displayed to a user.

The content management components 206 include a mobile content publishing framework 228 for defining content management for a secondary access channel. The mobile content publishing framework 228 may include one or more pre-configured content management components that assist in leveraging content developed for a primary access channel and customizing presentation of content for the secondary access channel. The content management framework components 206 also may include one or more presentation templates 230 (e.g., a mobile presentation template). A presentation template 230 may, for example, define the layout of elements displayed on an interface and default properties of an interface, such as a background color and a default font.

The content management framework components 206 further may include a design "jumpstart kit" 232. The "jumpstart kit" 232 may include, for example, guidelines for updating authoring templates. An authoring template may be used to determine the design of a content interface, to define content fields and elements which are to be displayed in the content interface, and, in some examples, to define default values for content fields and elements. The "jumpstart kit" 232 also may include guidelines for updating and managing content.

In addition, the content management framework components 206 may include components 234 for migrating streaming and/or downloaded content from a primary access channel to a secondary access channel. The components 234 for migrating streaming and/or downloaded content assist in handling streaming and/or downloaded content in an appropriate manner for the secondary access channel. For instance, the components 234 may be used to determine whether or not streaming and/or downloaded content is appropriate or possible on the secondary access channel. When streaming an/or downloaded content is inappropriate or not possible on the secondary access channel, the components 234 provide a recommendation that the streaming and/or downloaded content not be include in the secondary access channel and, in some implementations, suggest replacing the streaming and/or downloaded content within other content (e.g., an indication that streaming and/or downloaded content is available on the primary access channel and directions on how to access the primary access channel). When streaming an/or downloaded content is appropriate or possible on the secondary access channel, the components 234 assist in adapting the streaming and/or downloaded content to the secondary access channel to the extent adaptation is necessary.

Figure 3:
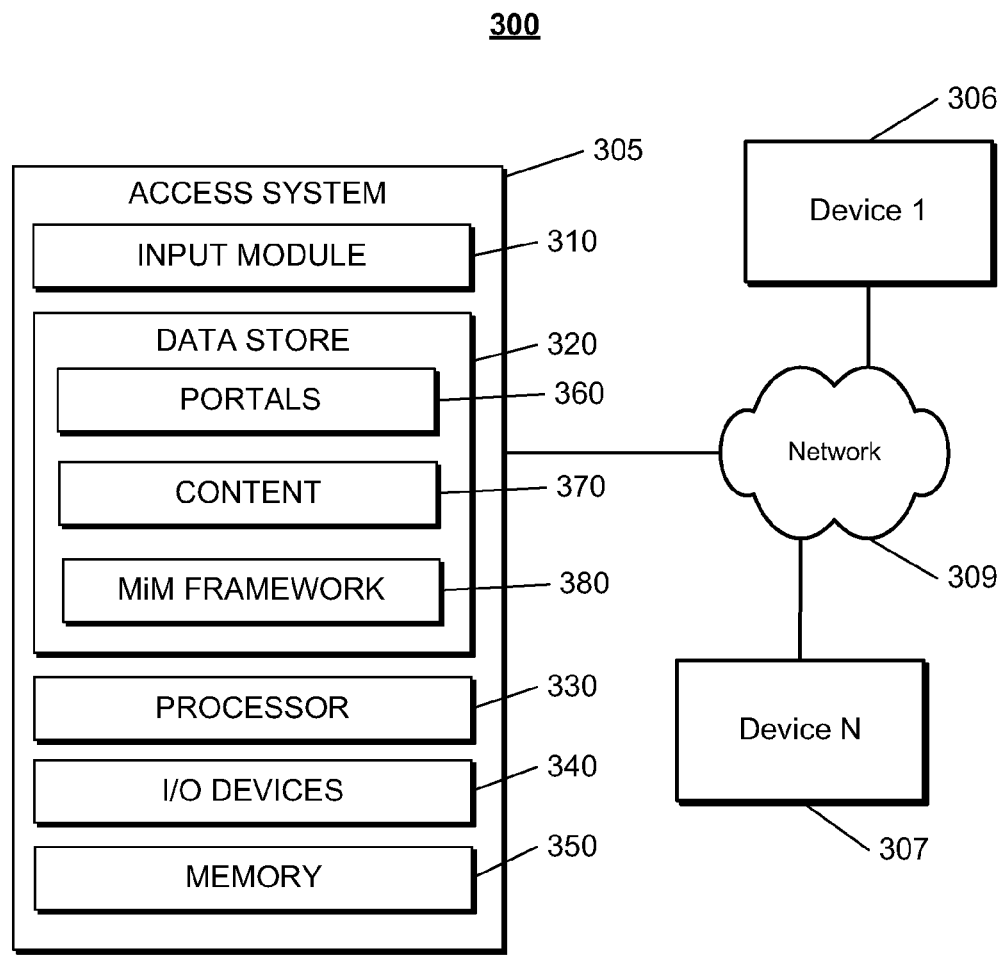

FIG. 3 illustrates an exemplary system 300 for defining and/or providing access channels. The system 300 includes an access system 305 connected to multiple client devices (e.g., client devices 306 and 307) by way of a network 309. The client devices 306 and 307 may be, for example, a personal computer, a mobile device, or any other device which may communicate over the network 309. The network 309 may be, for example, one or more wired or wireless networks, such as the Internet. The access system 305 includes an input module 310, a data store, one or more processors 330, one or more input/output (I/O) devices 340, and memory 350.

The input module 310 may be, for example, a graphical or non-graphical user interface which is configured to accept input from a user. The one or more processors 330 process operating system or application program computer instructions for the access system 305. The one or more input devices 340 may include, for example, a mouse, a keyboard, a joystick, a trackball, a touch-pad, a camera, a voice input device, a touch screen device implemented in combination with the input module 310, or any other appropriate input device. The memory 350 stores information and may be, for example, a volatile or non-volatile memory unit.

The data store 320 stores and records information or data, and may be an optical storage medium, magnetic storage medium, flash memory, or any other storage medium type. The data store 320 includes portal data 360 defining one or more portals, content data 370, and framework data 380 for one or more framework components. The portal data 360 may include, for example, one or more software source code files, one or more compiled code files, and one or more other files related to portal development. The content data 370 may include content items defined for one or more primary access channels, and content items defined for one or more secondary access channels, where some or all of the content items defined for the one or more secondary access channels are based on one or more content items defined for the one or more primary access channels. The framework data 380 may include data associated with defining a user experience for a secondary access channel, data defining a process for migrating portals from a primary access channel to a secondary access channel, and data defining configuring content management for a secondary access channel by leveraging content management defined for a primary access channel.

Figure 4:
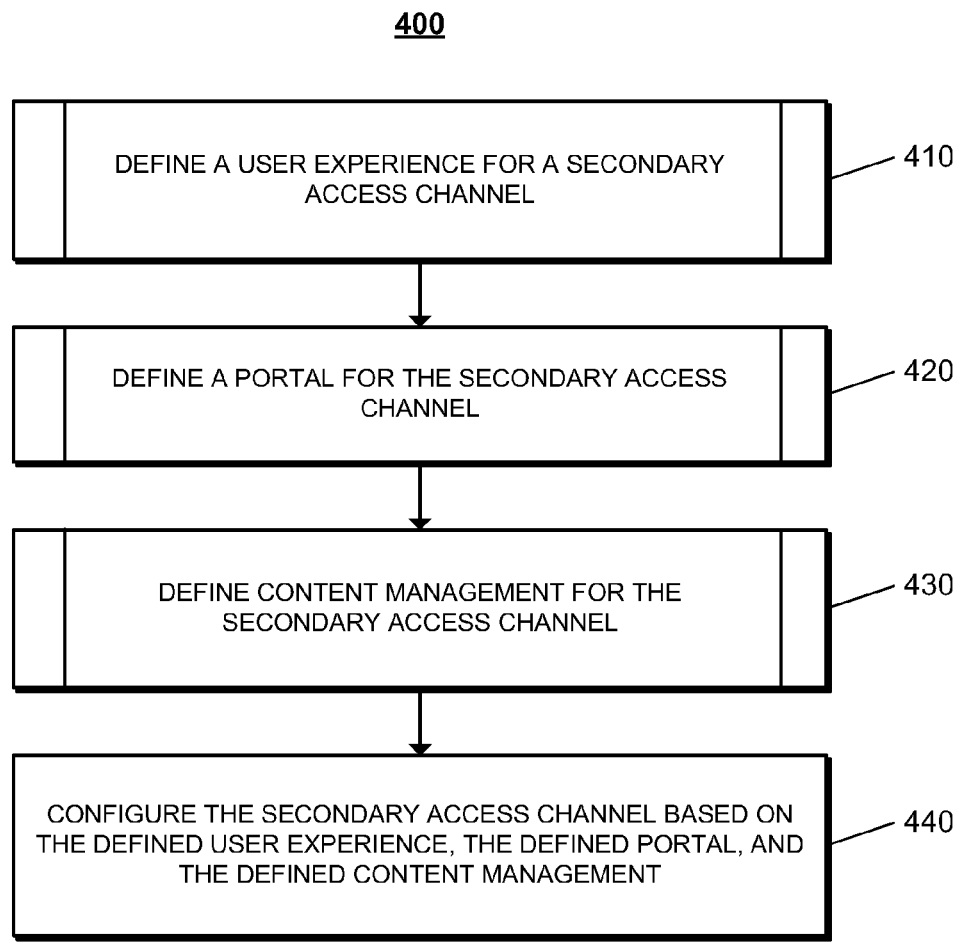
FIGS. 4, 5, 7, 9, and 12 are flowcharts of exemplary processes.

FIG. 4 illustrates a process 400 for defining a secondary access channel by leveraging a primary access channel. The operations of the process 400 are described generally as being performed by the system 300. The operations of the process 400 may be performed by one of the components of the system 300 (e.g., the access system 305) or may be performed by a combination of the components of the system 300. In some implementations, operations of the process 400 may be performed by one or more processors included in one or more electronic devices.

The system 300 defines a user experience for a secondary access channel (410). For example, the system 300 may display user interfaces and receive user input defining aspects of a user experience for a secondary access channel. In this example, the system 300 may store data based on the received user input to define the user experience for the secondary access channel. In storing data to define the secondary access channel, the system 300 may convert or format the received user input into a structure necessary to implement the user experience in the secondary access channel when users access the secondary access channel.

In some implementations, the system 300 may automatically define one or more aspects of the user experience without user input. In these implementations, the system 300 may analyze user experience attributes of a primary access channel and, when possible, map user experience attributes of the primary access channel to define the user experience for the secondary access channel. A user experience deals with aspects of user convenience in accessing content through a channel, such as appearance, utility, ease of use, and efficiency. Defining user experience is described in more detail below with respect to FIG. 5.

Figure 5:
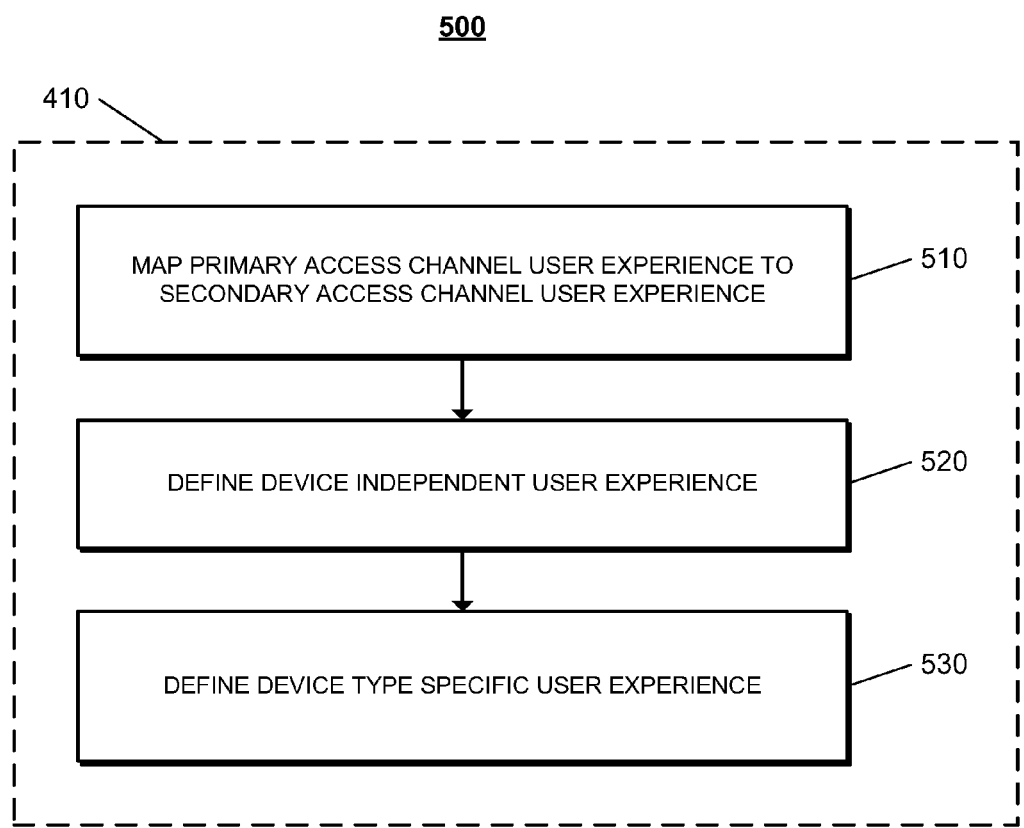

FIG. 5 illustrates a process 500 for defining a user experience for a secondary access channel. The process 500 may be used in defining a user experience for the secondary access channel referenced above with respect to reference numeral 410. The operations of the process 500 are described generally as being performed by the system 300. The operations of the process 500 may be performed by one of the components of the system 300 (e.g., the access system 305) or may be performed by a combination of the components of the system 300. In some implementations, operations of the process 500 may be performed by one or more processors included in one or more electronic devices.

Figure 6:
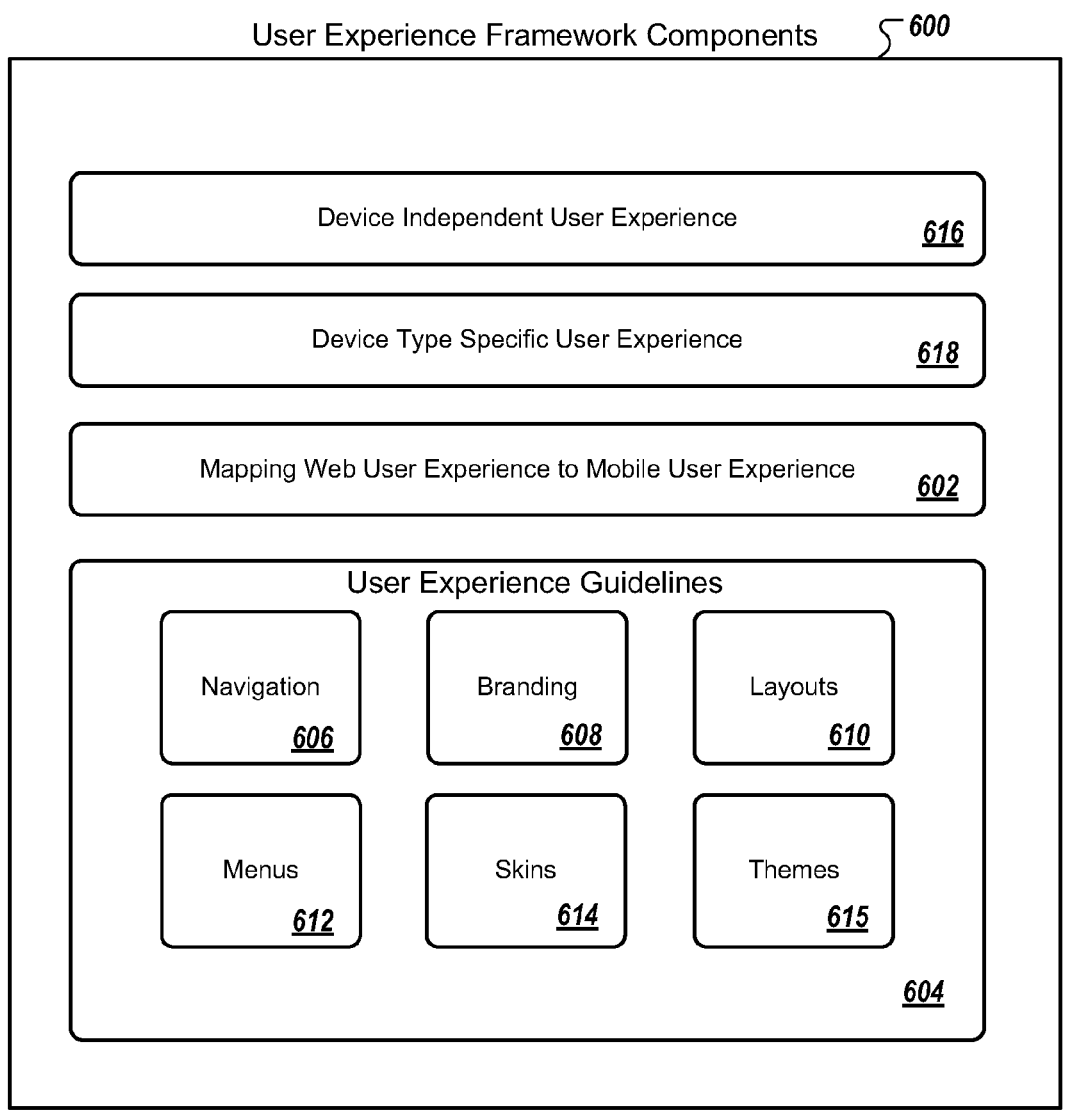

The system 300 maps a primary access channel user experience to a secondary access channel user experience (510). For example, the system 300 may define a user experience for a secondary access channel using one or more pre-configured user experience components that enable mapping of a user experience of a preexisting primary access channel to the user experience for the secondary access channel. In further detail and as illustrated in FIG. 6, the system 300 may use one or more user experience framework components 600, such as a mapping component 602, to map the user experience of the preexisting primary access channel to the user experience for the secondary access channel. The mapping component 602 may be used to map a user experience defined for a web channel to a user experience for the mobile channel. As another example, the system 300 may use the mapping component 602 to map a user experience defined for a web channel to a user experience for an Internet protocol television channel.

The mapping component 602 may define an automated process that steps a user through the decisions needed to map a user experience for a primary access channel to a user experience for a secondary access channel. For instance, the mapping component 602 may display interfaces that include instructions for mapping attributes of the user experience for the primary access channel to attributes of the user experience for the secondary access channel and that enable user input to select the needed mapping decisions.

The mapping component 602 also may display existing aspects of the user experience for the primary access channel to assist a user in mapping the user experience for the primary access channel to the user experience for the secondary access channel. For instance, the mapping component 602 may identify a background color used by the primary access channel and display the identified background color when requesting a user to provide input defining a background color for the secondary access channel.

The mapping component 602 further may display suggestions and recommendations for mapping the user experience for the primary access channel to the user experience for the secondary access channel. For example, the mapping component 602 may analyze aspects of the user experience for the primary access channel with respect to mapping rules and provide output indicating whether or not the analyzed aspects of the user experience for the primary access channel are appropriate or inappropriate for the secondary access channel according to the mapping rules. In this example, the mapping component 602 may identify an interactive menu feature of a web channel that uses JavaScript and provide a recommendation that the interactive menu feature is inappropriate for a mobile access channel and should not be directly mapped.

The suggestions and recommendations provided by the mapping component 602 also may include suggestions and recommendations for modifying aspects of the user experience for the primary access channel to make them better suited for the secondary access channel. In the example described above in which a web channel includes an interactive menu feature that uses JavaScript, the mapping component 602 may be used to suggest modifying the menu feature to remove the interactive JavaScript when defining the menu feature for a mobile channel. The mapping component 602 also may be used to suggest replacing an interactive component of the menu with one or more static components that provide similar functionality, but are better suited for presentation on a mobile device.

In some implementations, the mapping component 602 may define an automated process for automatically, without user input, mapping user experience attributes of the primary access channel to user experience attributes of the secondary access channel. In these implementations, the mapping component 602 may include one or more user experience mapping rules that are used to analyze user experience attributes of the primary access channel and automatically identify user experience attributes that are appropriate for the secondary access channel. The automatically identified user experience attributes may be directly included in a user experience for the secondary access channel defined by the mapping component 602 or may be modified prior to inclusion in the user experience for the secondary access channel to the extent modifications to the identified user experience attributes would benefit from modification when included in the secondary access channel.

The user experience framework components 600 also may include user experience guidelines 604, which may include navigation guidelines 606, branding guidelines 608, layouts guidelines 610, menu guidelines 612, skin guidelines 614, and theme guidelines 615. The system 300 may display the guidelines 606, 608, 610, 612, 614, and 615 to a user (and examples of pre-configured user experience components, such as pre-configured menus, pre-configured skins, pre-configured themes, etc.) and receive user input selecting user experience attributes from the guidelines. The selections may leverage one or more pre-configured user experience components and the system 300 may store, in electronic storage, the selected user experience attributes.

Returning to FIG. 5, the system 300 defines a device independent user experience (520). For example and referring to FIG. 6, the system 300 may use a component 616 to define a device independent user experience for the secondary access channel. The device independent user experience defines user experience for the secondary access channel in a manner that is independent of a type of device a user uses to access the secondary access channel. The device independent user experience is configured to be leveraged to provide a consistent user experience across multiple, different types of devices. For example, font characteristics, such as a default font family or font type (e.g., serif, sans-serif) may be defined for use across multiple types of devices.

The system 300 defines one or more device-type specific user experiences (530). For example and referring to FIG. 6, the system 300 may use a component 618 to define one or more device type specific user experiences for the secondary access channel. In this example, each device type specific user experience defines a user experience for the secondary access channel in a manner that is specific to a particular type of device a user uses to access the secondary access channel. In addition, each device type specific user experience is configured to be leveraged to provide a user experience when a user uses the particular type of device to access the secondary access channel. For instance, different default font sizes may be defined for different types of devices, based, for example, on the size of the display screen of each device. Also, interactive user experience features may be included in the user experience defined for devices that support interactive functionality and may be removed from the user experience defined for devices that do not support interactive functionality.

Returning to FIG. 4, the system 300 defines a portal for the secondary access channel (420). For example, the system 300 may display user interfaces and receive user input defining aspects of a portal for a secondary access channel. In this example, the system 300 may store data based on the received user input to define the portal for the secondary access channel. In storing data to define the secondary access channel, the system 300 may convert or format the received user input into a structure necessary to implement the portal in the secondary access channel when users access the secondary access channel.

In some implementations, the system 300 may automatically define one or more aspects of the portal without user input. In these implementations, the system 300 may analyze portal attributes of a primary access channel and, when possible, map portal attributes of the primary access channel to define the portal for the secondary access channel. A portal may be used to provide consistent appearance and consistent access to multiple, diverse information sources and services. Defining a portal for the secondary access channel is described in more detail below with respect to FIG. 7.

Figure 7:
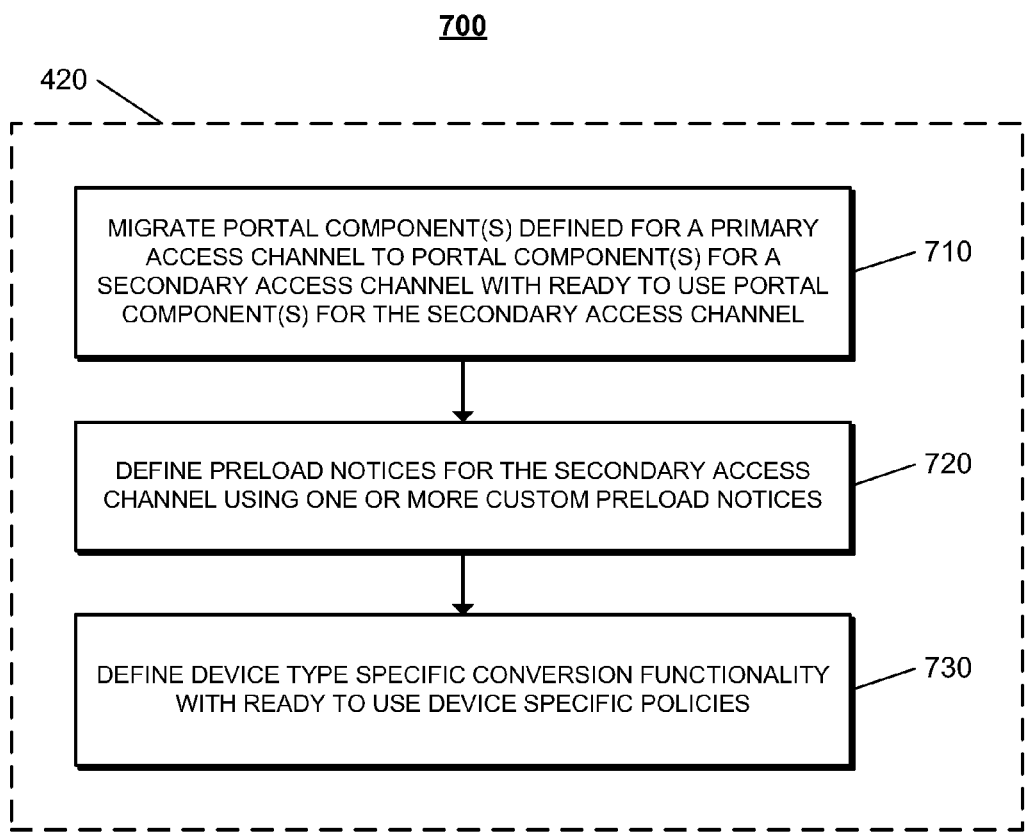

FIG. 7 illustrates a process 700 for defining a portal for a secondary access channel. The process 700 may be used in defining a portal for the secondary access channel referenced above with respect to reference numeral 420. The operations of the process 700 are described generally as being performed by the system 300. The operations of the process 700 may be performed by one of the components of the system 300 (e.g., the access system 305) or may be performed by a combination of the components of the system 300. In some implementations, operations of the process 700 may be performed by one or more processors included in one or more electronic devices.

Figure 8:
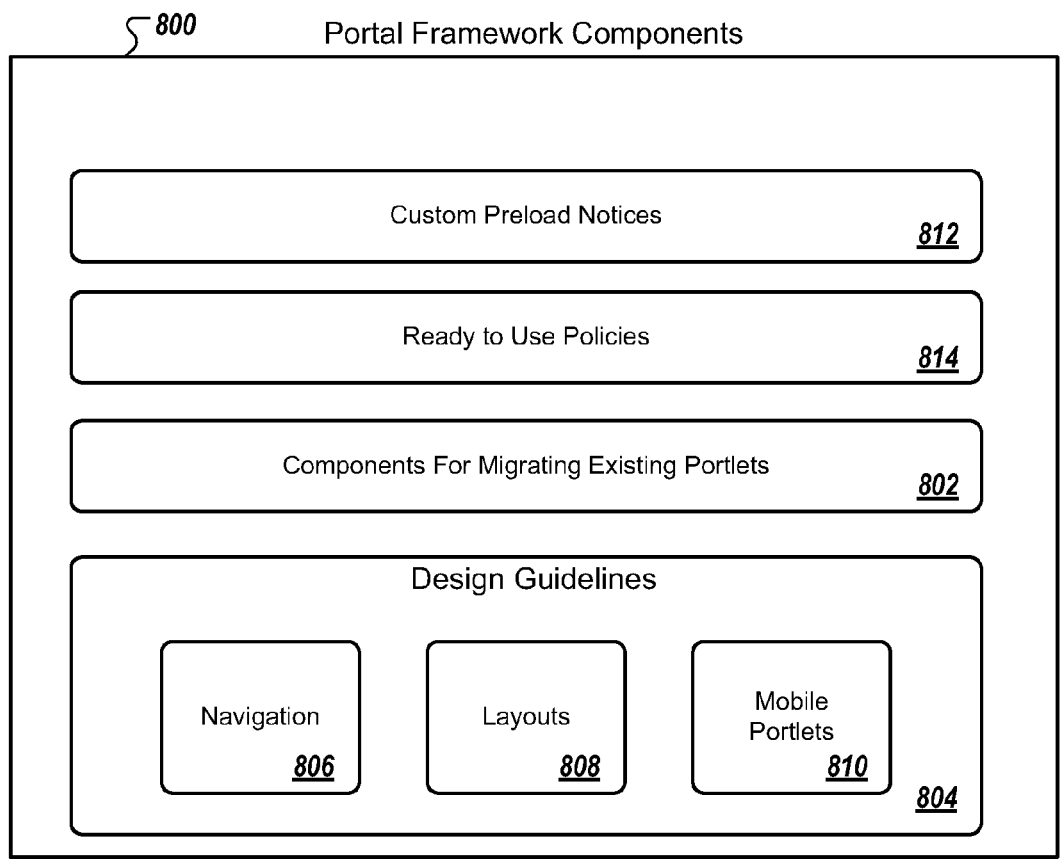

The system 300 migrates one or more portal components defined for a primary access channel to one or more portal components for a secondary access channel with one or more ready to use portal components for the secondary access channel (710). For example and as shown in FIG. 8, the system 300 may use one or more portal framework components 800, such as a migration component 802 for migrating one or more existing portlets for the primary access channel for use with the secondary access channel. As described above, a portlet is a region of a user interface which may be used to display information or offer a service.

The system 300 may migrate some or all portlets for the primary access channel to the secondary access channel. For example, the system 300 may receive input selecting, from among multiple portal components defined for the primary access channel, a subset of the multiple portal components to include in the secondary access channel. Based on the selection of the subset of the multiple portal components to include in the secondary access channel, the system 300 may migrate the subset of the multiple portal components to the secondary access channel such that the secondary access channel includes less than all of the multiple portal components defined for the primary access channel.

As another example, the system 300 may receive a first input and a second input, where the first input represents a selection of a first portal component defined for the primary access channel to include in the secondary access channel and the second input represents selection of a second portal component defined for the primary access channel to include in the secondary access channel. The second portal component is different than the first portal component. Based on the selection of the first portal component and the second portal component, the system 300 may integrate the first portal component and the second portal in the portal for the secondary access channel.

The migration component 802 may define an automated process that steps a user through the decisions needed to migrate a portal for a primary access channel to a portal for a secondary access channel. For instance, the migration component 802 may display interfaces that include instructions for migrating the portal for the primary access channel to the portal for the secondary access channel and that enable user input to select the needed migration decisions.

The migration component 802 also may display existing aspects of the portal for the primary access channel to assist a user in migrating the portal for the primary access channel to the portal for the secondary access channel. For instance, the migration component 802 may identify portlets used by the primary access channel and display the identified portlets when requesting a user to provide input defining which portlets to include in the portal for the secondary access channel.

The migration component 802 further may display suggestions and recommendations for migrating the portal for the primary access channel to the portal for the secondary access channel. For example, the migration component 802 may analyze portlets of the portal for the primary access channel with respect to migration rules and provide output indicating whether or not the analyzed portlets of the portal for the primary access channel are appropriate or inappropriate for the secondary access channel according to the migration rules.

The suggestions and recommendations provided by the migration component 802 also may include suggestions and recommendations for modifying aspects of the portal for the primary access channel to make them better suited for the secondary access channel. For instance, the migration component 802 may be used to suggest modifying (e.g., changing or removing) elements of a portlet when migrating the portlet from the primary access channel to the secondary access channel.

In some implementations, the migration component 802 may define an automated process for automatically, without user input, migrating portal attributes of the primary access channel to portal attributes of the secondary access channel. In these implementations, the migration component 802 may include one or more portal migration rules that are used to analyze portal attributes of the primary access channel and automatically identify portal attributes (e.g., portlets) that are appropriate for the secondary access channel. The automatically identified portal attributes may be directly included in a portal for the secondary access channel defined by the migration component 802 or may be modified prior to inclusion in the portal for the secondary access channel to the extent modifications to the identified portal attributes would benefit from modification when included in the secondary access channel.

The portal framework components 800 also may include guidelines 804, which may include navigation guidelines 806, layout guidelines 808, and mobile portlets 810. The mobile portlets 810 may be device independent mark up portlets created using a device independent authoring language. The mobile portlets 810 may be ready to use portlets that a user can select and include a portal for a secondary access channel. The mobile portlets 810 may include LRP (Local Rendering Portlet) and RRP (Remote Rendering Portlet) portlets. In general, a rendering portlet may be used to display content management content in a portal page. A local rendering portlet may be used to display content within a portlet that is served by the same server which includes a content management system. In contrast, a remote rendering portlet may be used to display content within a portlet served by a portal server which does not include a content management system (e.g., the content management system may be included on a server other than the server which serves the RRP).

The system 300 may define a portal for the secondary access channels that leverages the mobile portlets 810. In addition, the system 300 may receive user input selecting portal attributes from the guidelines 806 and 808 and may store, in electronic storage, the selected portal attributes.

Returning to FIG. 7, the system 300 defines one or more preload notices for the secondary access channel using one or more custom preload notices (720). For example and in reference to FIG. 8, the system 300 may use a custom preload notices component 812 to define one or more preload notices for the secondary access channel. As described above, a preload notice may be a portlet which is used to display information before a requested portlet or page is displayed to a user. Preload notices may be used, for example, to display an informational message to a user before the user views target content, to display an advertisement, or to warn the user about target content before displaying the target content. The system 300 may display the custom preload notices included in the custom preload notices component 812 to a user and the user may select a subset of the custom preload notices to include in the portal for the secondary access channel. Upon selection, the system 300 may define the portal for the secondary access channel to include the selected preload notice without any additional effort from the user.

Returning to FIG. 7, the system 300 defines device-type specific conversion functionality with ready to use device-specific policies (730). For example and in reference to FIG. 8, the system 300 may use a policies component 814. Policies may be used to separate application design from application delivery. Policies may include, for example, bindings of resources to different device types (e.g., variants), graphical layouts for different devices, or stylistic themes for different devices. In some implementations, the policies component 814 may include one or more MCS (Multi-Channel Server) policies. The system 300 may display the ready to use policies included in the policies component 814 to a user and the user may select a subset of the policies to include in the portal for the secondary access channel. Upon selection, the system 300 may define the portal for the secondary access channel to include the selected policies without any additional effort from the user.

Returning to FIG. 4, the system 300 defines content management for the secondary access channel (430). For example, the system 300 may display user interfaces and receive user input defining aspects of content management for a secondary access channel. In this example, the system 300 may store data based on the received user input to define the content management for the secondary access channel. In storing data to define the secondary access channel, the system 300 may convert or format the received user input into a structure necessary to implement the content management in the secondary access channel when users access the secondary access channel.

In some implementations, the system 300 may automatically define one or more aspects of the content management without user input. In these implementations, the system 300 may analyze content management attributes of a primary access channel and, when possible, map content management attributes of the primary access channel to define the content management for the secondary access channel. Content management may include, for example, management of presentation and authoring templates. Defining content management for the secondary access channel is described in more detail below with respect to FIG. 9.

Figure 9:
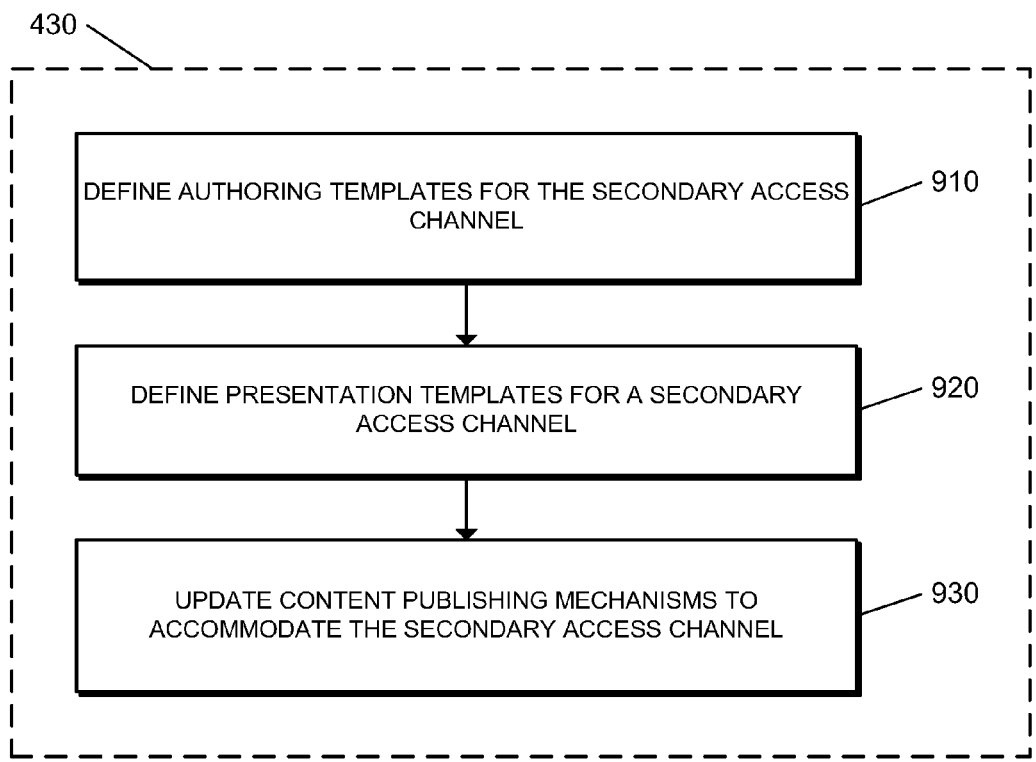

FIG. 9 illustrates a process 900 for defining content management for a secondary access channel. The process 900 may be used in defining content management for the secondary access channel referenced above with respect to reference numeral 430. The operations of the process 900 are described generally as being performed by the system 300. The operations of the process 900 may be performed by one of the components of the system 300 (e.g., the access system 305) or may be performed by a combination of the components of the system 300. In some implementations, operations of the process 900 may be performed by one or more processors included in one or more electronic devices.

Figure 10:
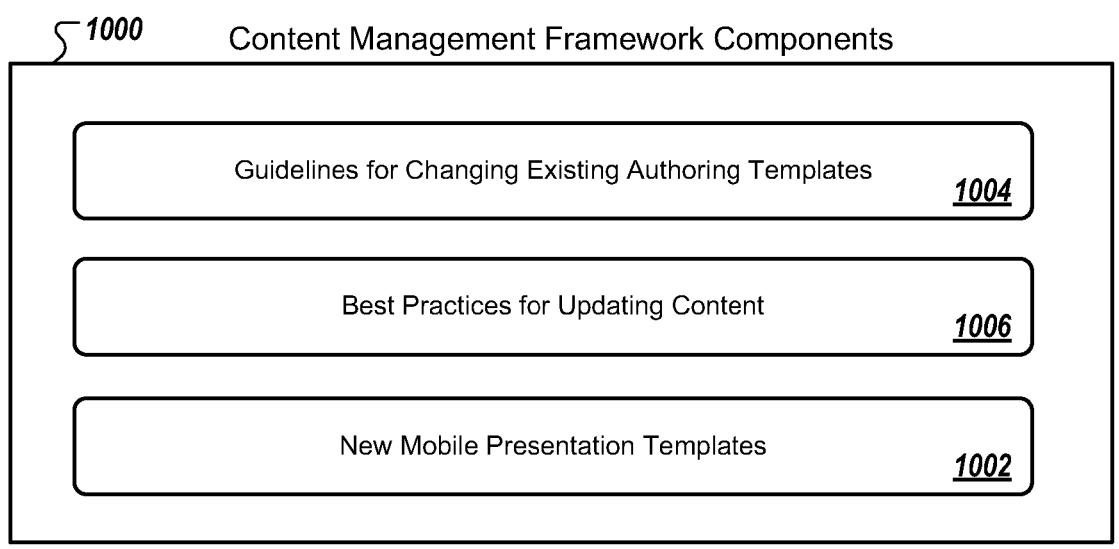

The system 300 defines one or more authoring templates for the secondary access channel (910). As described above, an authoring template may be used to determine the design of a content interface, to define content fields and elements which may be displayed in the content interface, and, in some examples, to define default values for content fields and elements. An authoring template may be associated with a presentation template, such as by using a template map. The system 300 may define one or more authoring templates for the secondary access channel based on one or more existing authoring templates for the primary access channel. As illustrated in FIG. 10, the content management framework components 1000 may include guidelines 1004 for changing existing authoring templates (e.g., guidelines for changing authoring templates for the primary access channel to accommodate the secondary access channel). The system 300 may display the guidelines 1004 to a user with existing authoring templates and receive user input making changes to the existing authoring templates based on the guidelines 1004. The system 300 may store, in electronic storage, changed authoring templates based on the changes received in the user input. In addition, in some examples, the system 300 may use the guidelines 1004 to suggest or recommend specific changes to existing authoring templates or automatically, without user input, change the existing authoring templates in defining content management for the secondary access channel.

The system 300 defines one or more presentation templates for a secondary access channel (920). As described above, a presentation template may, for example, define the layout of elements displayed on an interface and default properties of an interface, such as a background color and a default font. A presentation template may include one or more placeholders (e.g., tags) which refer to components of an authoring template. As illustrated in FIG. 10, pre-configured presentation templates may be included in a presentation templates component 1002 of a set of content management framework components 1000. The system 300 may display the pre-configured presentation templates included in the presentation templates component 1002 to a user and the user may select one or more of the presentation templates to use in content management for the secondary access channel. Upon selection, the system 300 may define content management for the secondary access channel to include the selected presentation template for content management without any additional effort from the user.

The system 300 updates one or more content publishing mechanisms to accommodate the secondary access channel (930). For example, the system 300 may update one or more content publishing mechanisms such that content made available through the primary access channel is also made available through the secondary access channel. As another example, the system 300 may define content management for a mobile channel using one or more pre-configured content management components that leverage content developed for a web channel and that customize presentation of the content for the mobile channel. In a similar example, the system 300 may define content management for an Internet protocol television channel using one or more pre-configured content management components that leverage content developed for the web channel and that customize presentation of the content for the Internet protocol television channel.

As illustrated in FIG. 10, the content management framework components 1000 may include best practices 1006 for updating content. The system 300 may display the best practices 1006 to a user and receive user input defining content publishing mechanisms based on the best practices 1006. The system 300 may store, in electronic storage, content publishing mechanisms based on the received user input. In addition, in some examples, the system 300 may use the best practices 1006 to suggest or recommend specific changes to content publishing mechanisms or automatically, without user input, define content publishing mechanisms for the secondary access channel.

Returning to FIG. 4, the system 300 configures the secondary access channel based on the defined user experience, the defined portal, and the defined content management (440). For example, the system 300 arranges the defined user experience, the defined portal, and the defined content management in a secondary access channel in a manner that makes the secondary access channel accessible to users. In this example, users may begin accessing content through the secondary access channel and the user's access meets the parameters included in the defined user experience, the defined portal, and the defined content management. The system 300 may configure a mobile channel, may configure an Internet protocol television channel, or may configure any type of secondary access channel.

Figure 11:
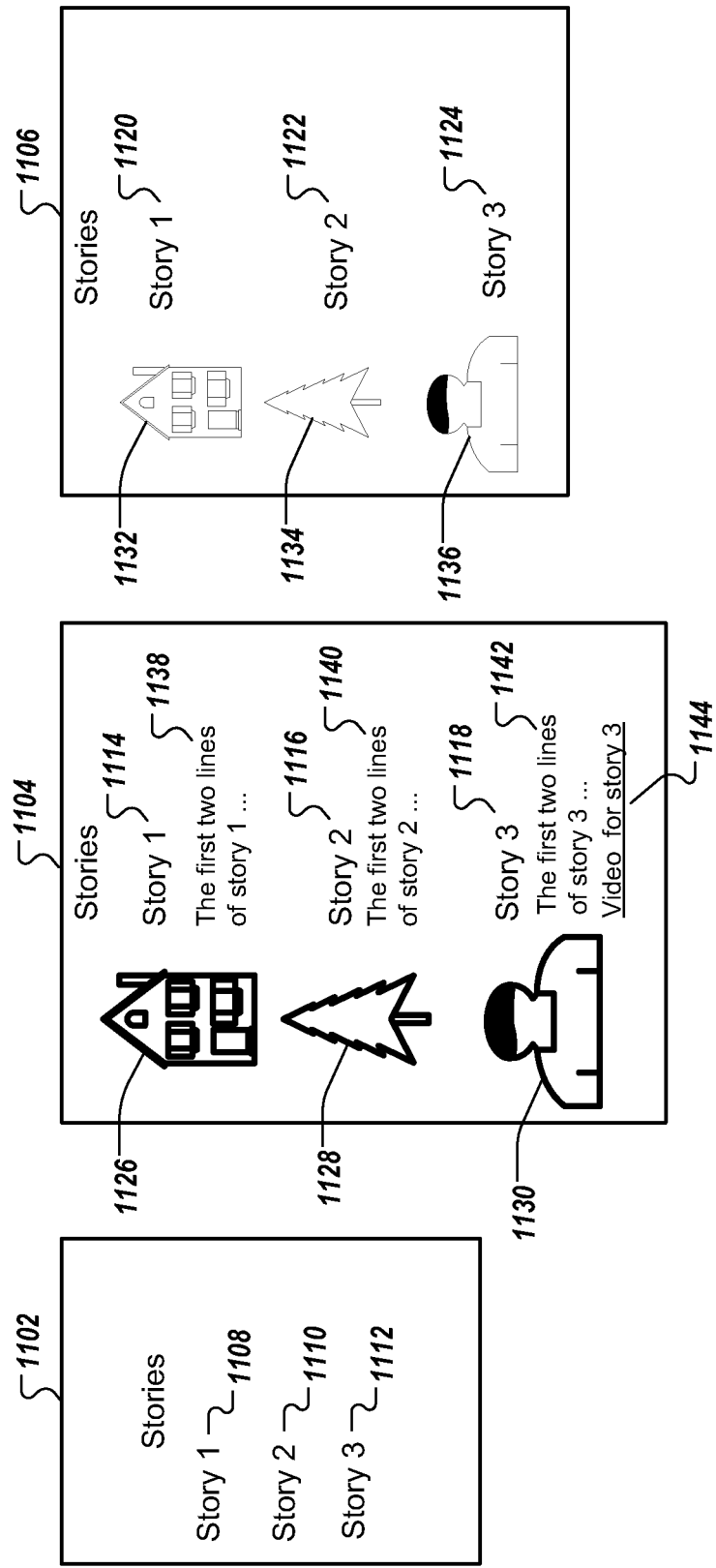
FIG. 11 is a diagram of exemplary mobile device displays.
Like reference numbers represent corresponding parts throughout.

FIG. 11 illustrates example mobile device displays 1102, 1104, and 1106. Each of the mobile device displays 1102, 1104, and 1106 may be a display of a different mobile device. Each of the displays 1102, 1104, and 1106 are displaying content for an associated mobile channel which has been defined by leveraging the same web channel. For example, each of the displays 1102, 1104, and 1106 are displaying a portal which includes information on three stories. Each of the displays 1102, 1104, and 1106 include respective links (e.g., links 1108, 1110, 1112; links 1114, 1116, 1118; and links 1120 1122, 1124) to the three stories.

Although each of the mobile portals displayed in the displays 1102, 1104, and 1106 are each leveraging the same web channel, the appearance and amount of content displayed on each of the displays 1102, 1104, and 1106 vary based on the capabilities of the displays 1102, 1104, and 1106. For example, the displays 1104 and 1106 may support the display of graphics 1126, 1128, and 1130 and 1132, 1134, and 1136, respectively, while the display 1102 may not support the displaying of graphics. The display 1104 may have a larger display area and a higher resolution than the display 1106, which may result in the images 1126, 1128, and 1130 displayed on the display 1104 being displayed in a larger or otherwise different size, in a brighter or different color, or in an otherwise higher quality format than the images 1132, 1134, and 1136 displayed on the display 1106.

As another example, the larger size of the display 1104 may allow for additional content 1138, 1140, and 1142 (e.g., partial story content) to be displayed on the display 1104. Such links to additional content may not be displayed, for example, on the smaller displays 1102 and 1106. As another example, the display 1104 (and the associated mobile device) may have the capability to display video, so a video link 1144 may be displayed on the display 1104. Video links may not be displayed on the displays 1102 and 1106 if the displays 1102 and 1106 (and the corresponding mobile devices) do not have capability to display video. The different configuration of the displays 1102, 1104, and 1106 may be achieved using the device type specific attributes discussed above in defining the secondary access channel (e.g., the mobile access channel).

Figure 12:
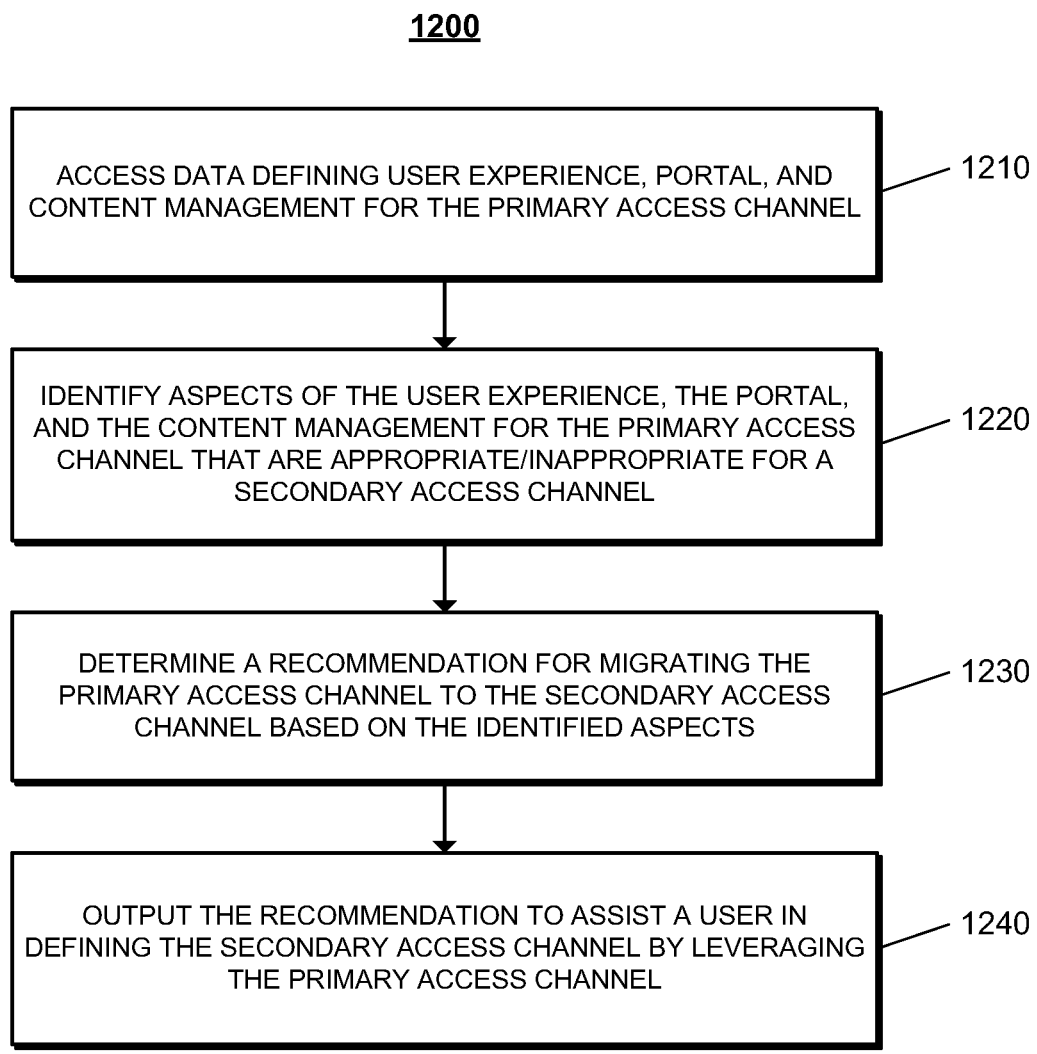

FIG. 12 illustrates a process 1200 for determining a recommendation for migrating a primary access channel to a secondary access channel. The operations of the process 1200 are described generally as being performed by the system 300. The operations of the process 1200 may be performed by one of the components of the system 300 (e.g., the access system 305) or may be performed by a combination of the components of the system 300. In some implementations, operations of the process 1200 may be performed by one or more processors included in one or more electronic devices.

Figure 13:
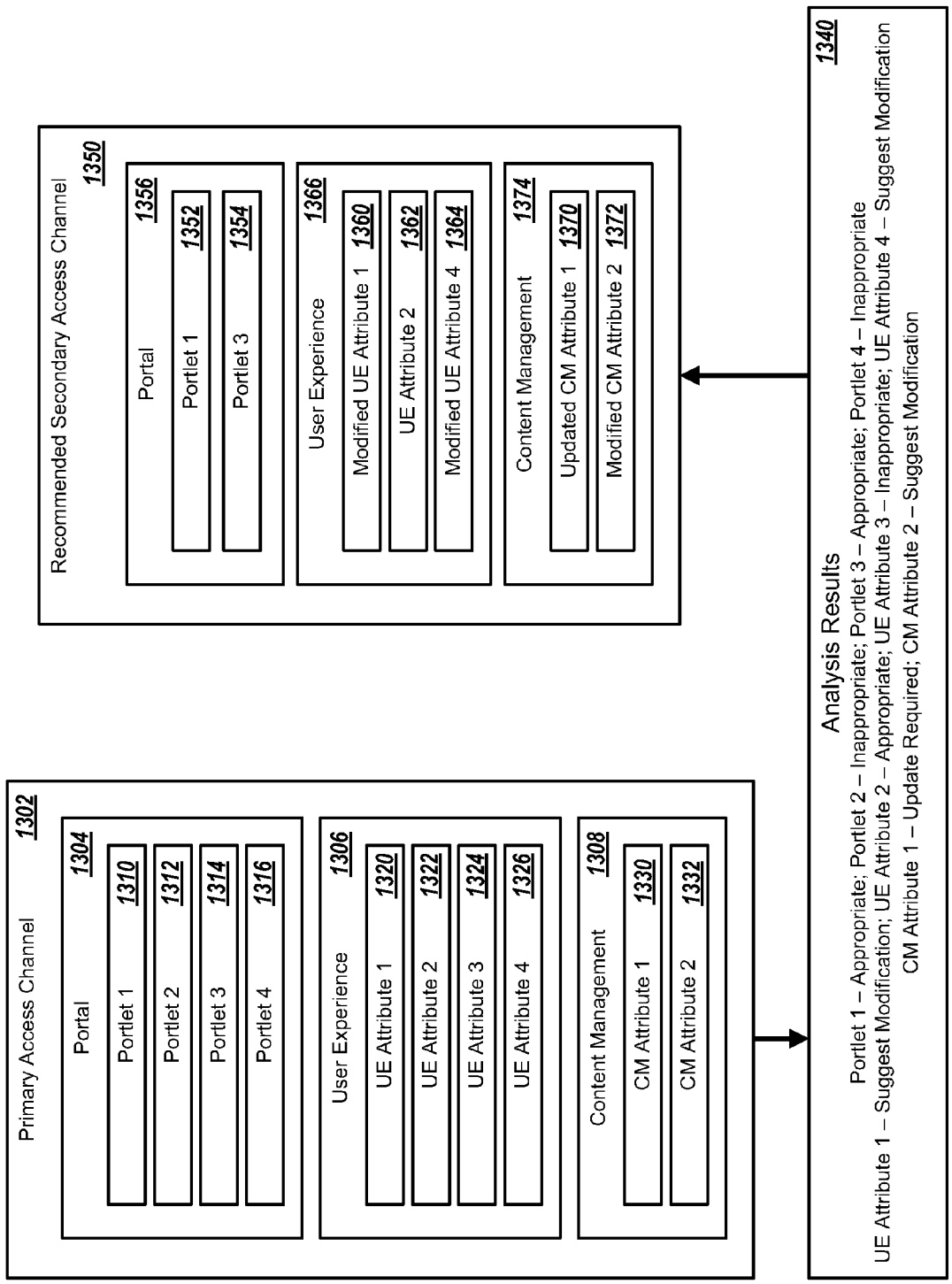

The system 300 accesses data defining a user experience, a portal, and content management for the primary access channel (1210). For example and as illustrated in FIG. 13, the system 300 may access data 1302 for a primary access channel. The primary access channel data 1302 includes portal data 1304 defining a portal for the primary access channel, user experience data 1306 defining a user experience for the primary access channel, and content management data 1308 defining content management for the primary access channel.

The portal data 1304 includes portlet data 1310, 1312, 1314, and 1316 defining portlets one, two, three, and four, respectively. The user experience data 1306 includes attribute data 1320, 1322, 1324, and 1326 defining first, second, third, and fourth user experience attributes, respectively. The content management data 1308 includes content data 1330 and 1332 defining first and second content management attributes, respectively.

Returning to FIG. 12, the system 300 identifies one or more aspects of the user experience, the portal, and the content management for the primary access channel that are appropriate/inappropriate for a secondary access channel (1220). For example, the system 300 may analyze the user experience, portal, and content management data and may identify aspects which are appropriate or inappropriate for a secondary access channel based, for example, on the capabilities of the secondary access channel and based on comparing the user experience, portal, and content management data to a set of rules.

For example and as shown in FIG. 13, analysis results 1340 indicate that the first and third portlets are appropriate for a secondary access channel (e.g., as determined by analyzing portlet definition data 1310 and 1314, respectively) and that the second and fourth portlets are inappropriate for the secondary access channel (e.g., as determined by analyzing portlet definition data 1312 and 1316, respectively). The analysis results 1340 also indicate that the second user experience attribute is inappropriate for the secondary access channel (e.g., as determined by analyzing user experience definition data 1322) and that the third user experience attribute is appropriate for the secondary access channel (e.g., as determined by analyzing user experience definition data 1324).

The analysis results 1340 also indicate suggested modifications to the first and fourth user experience attributes (e.g., as determined by analyzing user experience definition data 1320 and 1326, respectively). In other words, the first and fourth user experience attributes may be identified as appropriate if suggested modifications are made. For example, a menu may be identified as appropriate if fewer items are included or if the cascading of the menu is altered to accommodate the secondary access channel (e.g., to accommodate the size of a mobile device display).

As another example, the analysis results 1340 indicate a suggested modification to the second content management attribute (e.g., as determined by analyzing content management definition data 1332). For example, a modification to an authoring template may be suggested. The analysis results 1340 indicate a recommended update to the first content management attribute (e.g., as determined by analyzing content management definition data 1330). For example, it may be recommended that the first content management attribute be updated by an automatic conversion process, such as a conversion between data of different data types. In this example, content defined in a first protocol supported by the primary access channel may be updated to be defined in a second protocol supported by the secondary access channel.

Returning to FIG. 12, the system 300 determines a recommendation for migrating the primary access channel to the secondary access channel based on the identified aspects (1230). For example and as illustrated in FIG. 13, recommendations 1350 for a secondary access channel may be determined. The recommendations 1350 include recommendations 1352 and 1354 to include the first and third portlets in a recommended portal 1356. The recommendations 1350 also include recommendations 1360, 1362, and 1364 to include a modified first user experience attribute, the second user experience attribute, and a modified third user experience attribute, respectively, as part of a recommended user experience 1366. As another example, the recommendations 1350 include a recommendation 1370 to include an updated first content management attribute and a recommendation 1372 to include a modified second content management attribute as part of content management recommendations 1374 for the secondary access channel.

Returning to FIG. 12, the system 300 outputs the recommendation to assist a user in defining the secondary access channel by leveraging the primary access channel (1240). For example, the recommendations 1350 may be displayed in an interface to a user defining a second access channel. The recommendations 1350 also may be included in a report for distribution to one or more users.

In some implementations, the system 300 may develop a visual representation of the secondary access channel based on the recommendations 1350. In these implementations, the system 300 may display the visual representation of the secondary access channel to the user to show the user what the recommended secondary access channel would look like. The displayed visual representation may assist the user in determining whether or not to accept or reject recommendations made by the system 300. The system 300 then may receive user input indicating which or the recommendations are accepted and define the secondary access channel based on the accepted recommendations. In some examples, the system 300 may automatically, without user input, define the secondary access channel in accordance with the recommendations 1350.

Figure 14:
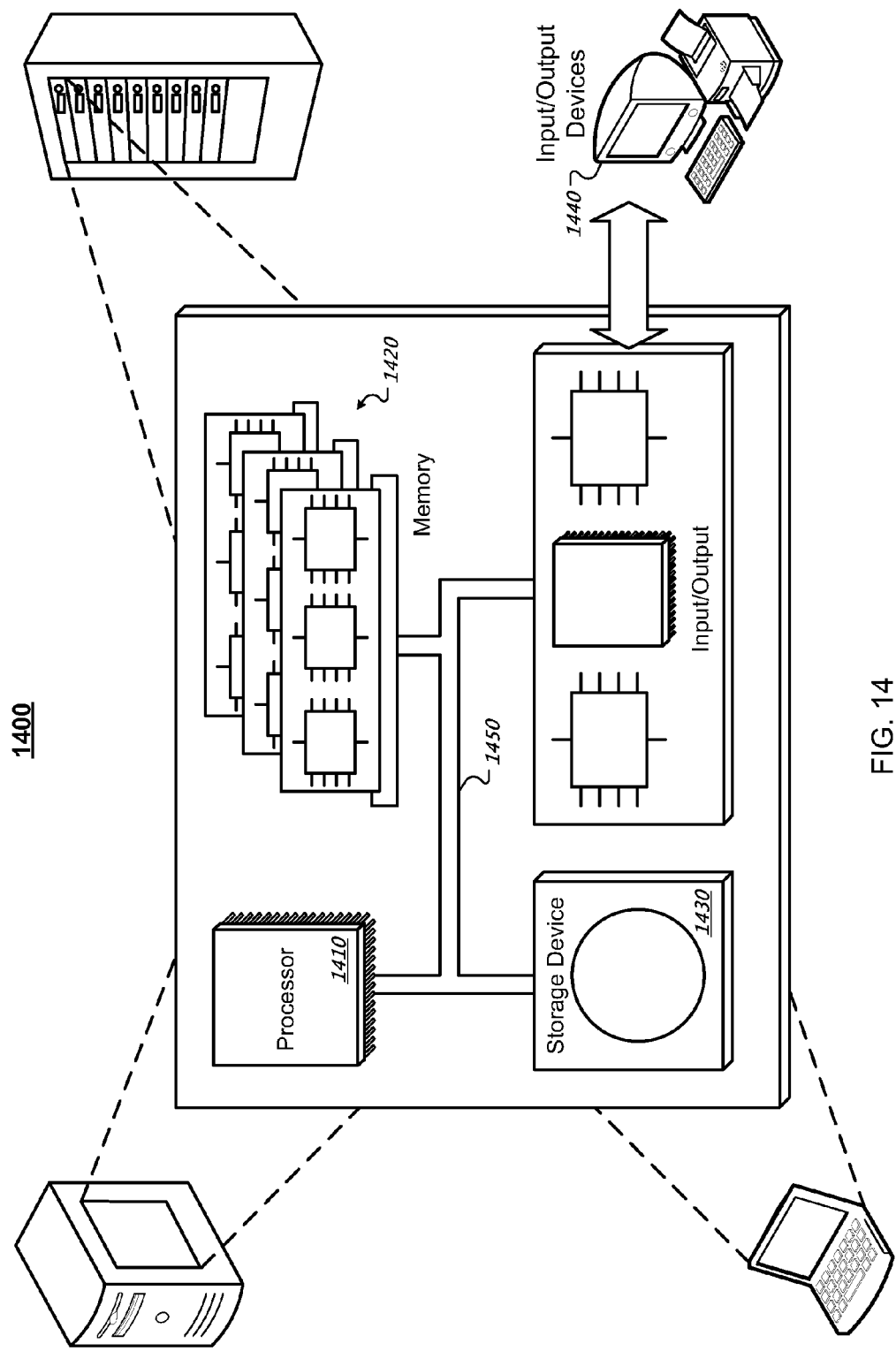

FIG. 14 is a schematic diagram of an example of a computer system 1400. The system 1400 can be used for the operations described in association with the processes 400, 500, 700, 900, and 1200 according to one implementation. For example, the system 1400 may be included in the access system 305, the device 306, and/or the device 307.

The system 1400 includes a processor 1410, a memory 1420, a storage device 1430, and an input/output controller connected to input/output devices 1440. Each of the components 1410, 1420, 1430, and the input/output controller connected to the input/output devices 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or instructions stored on the storage device 1430 to display graphical information for a user interface on at least one of the input/output devices 1440. As shown, the system 1400 may be used in a laptop computer, a desktop computer, or a server. Also, as shown, examples of the input/output devices 1440 include a keyboard, a display unit, and a printer.

The memory 1420 stores information within the system 1400. In one implementation, the memory 1420 is a computer-readable medium. In one implementation, the memory 1420 is a volatile memory unit. In another implementation, the memory 1420 is a non-volatile memory unit.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer system comprising:
at least one processor;
at least one memory unit coupled to the processor having stored thereon instructions which when executed by the at least one processor, cause the at least one processor to:
determine whether to define a new secondary access channel based on an existing primary access channel, the primary access channel being configured to be accessed by a set of one or more device types and the secondary access channel being configured to be accessed by a set of one or more different device types;
in response to a determination to define the new secondary access channel based on the existing primary access channel, access data defining a user experience that includes multiple user experience attributes, a portal that includes multiple portlets, and content management that includes a content management attribute, for the primary access channel;
determine characteristics of the set of one or more different device types to access the secondary access channel;
automatically identify aspects of the user experience, the portal, and the content management for the primary access channel as either appropriate for the secondary access channel or inappropriate for the secondary access channel based on applying a set of stored mapping rules to the characteristics of the set of one or more different device types to access the secondary access channel and the data defining the user experience, the portal, and the content management for the primary access channel;
automatically determine multiple recommendations for migrating the primary access channel to the secondary access channel based on the aspects of the user experience, the portal, and the content management for the primary access channel that are identified as inappropriate for the secondary access channel, where each of the multiple recommendations indicates one or more of that a particular user experience attribute included in the user experience of the primary access channel is inappropriate for the secondary access channel, that a particular portlet of the portal of the primary access channel is inappropriate for the secondary access channel, or that a particular content management attribute of the primary access channel is inappropriate for the secondary access channel;
output on a display the multiple recommendations for migrating the primary access channel to the secondary access channel to assist in defining the secondary access channel;
receive a user input indicating which of the multiples recommendations output on the display are accepted by the user;
in response to the receipt of the user input indicating which of the multiples recommendations output on the display are accepted by the user, define a user experience for the secondary access channel based at least on the user input and to enable mapping of the user experience defined for the primary access channel to the user experience for the secondary access channel and to adapt the user experience for the secondary access channel to the characteristics of the set of one or more different device types to access the secondary access channel;

define a portal for the secondary access channel based at least on the user input;
define content management for the secondary access channel based at least on the user input and to customize presentation of content for the secondary access channel; and
configure the secondary access channel based on the defined user experience for the secondary access channel, the defined portal for the secondary access channel, and the defined content management for the secondary access channel such that the set of one or more different devices access the secondary access channel.

2. The system of claim 1, where, when defining the user experience for the secondary access channel, the at least one processor is further to:
map a primary access channel user experience to a secondary access channel user experience.

3. The system of claim 1, where, when defining the user experience for the secondary access channel, the at least one processor is further to:
define a device independent user experience for the secondary access channel that defines the user experience for the secondary access channel that is independent of a type of device used to access the secondary access channel, the device independent user experience providing a consistent user experience across multiple, different types of devices.

4. The system of claim 1, where, when defining the user experience for the secondary access channel, the at least one processor is further to:
define a device type specific user experience for the secondary access channel that defines the user experience for the secondary access channel that is specific to a particular type of device used to access the secondary access channel, the device type specific user experience providing a user experience when the particular type of device is used to access the secondary access channel.

5. The system of claim 1, where when defining the portal for the secondary access channel, the at least one processor is further to:
define the portal for the secondary access channel by migrating at least one portal component defined for the primary access channel to at least one portal component for the secondary access channel.

6. The system of claim 1, where, when defining the portal for the secondary access channel, the at least one processor is further to:
migrate at least one portal component defined for the primary access channel to at least one portal component for the secondary access channel using a ready to use portal component for the secondary access channel.

7. The system of claim 6, where, when migrating the at least one portal component defined for the primary access channel to the at least one portal component for the secondary access channel, the at least one processor is further to:
receive, from among multiple portal components defined for the primary access channel, a selection of a subset of the multiple portal components to include in the secondary access channel; and
based on the selection of the subset of the multiple portal components to include in the secondary access channel, migrate the subset of the multiple portal components to the secondary access channel such that the secondary access channel includes less than all of the multiple portal components defined for the primary access channel.

8. The system of claim 6, where, when migrating the at least one portal component defined for the primary access channel to the at least one portal component for the secondary access channel, the at least one processor is further to:
receive a selection of a first portal component defined for the primary access channel to include in the secondary access channel;
receive a selection of a second portal component defined for the primary access channel to include in the secondary access channel, the second portal component being different than the first portal component; and
based on the selection of the first portal component and the selection of the second portal component, integrate, in the portal for the secondary access channel, the first portal component defined for the primary access channel and the second portal component defined for the primary access channel.

9. The system of claim 1, where, when defining the user experience for the secondary access channel, the at least one processor is further to:
receive a user input selecting user experience attributes from one or more pre-configured user experience components, and
store the selected user experience attributes;
where, when defining the portal for the secondary access channel, the at least one processors is further to:
receive a user input selecting portal attributes from one or more pre-configured portal components, and
store the selected portal attributes; and
where, when defining content management for the secondary access channel, the at least one processor is further to:
receive a user input selecting content management attributes from one or more pre-configured content management components, and
store the selected content management attributes.

10. The system of claim 1, where, when defining the user experience for the secondary access channel, the at least one processor is further to:
define the user experience for the secondary access channel using one or more pre-configured user experience components that enable mapping of a user experience of a preexisting primary access channel to the user experience for the secondary access channel.

11. The system of claim 1:
where, when analyzing the data defining the user experience, the portal, and the content management for the primary access channel to identify aspects of the user experience, the portal, and the content management for the primary access channel that are appropriate for the secondary access channel and that are inappropriate for the secondary access channel, the at least one processor is further to identify at least one aspect of the user experience, the portal, and the content management for the primary access channel as appropriate if one or more suggested modifications are made to the at least one aspect; and
where, when determining a recommendation for migrating the primary access channel to the secondary access channel based on the identified aspects of the user experience, the portal and the content management for the primary access channel that are appropriate for the secondary access channel and that are inappropriate for the secondary access channel, the at least one processor is further to determine a recommendation to include the at least one aspect in the secondary access channel after making the one or more suggested modifications.

12. The system of claim 1, where, when outputting the multiple recommendations to assist in defining the secondary access channel, the at least one processor is further to:
   develop a visual representation of the secondary access channel based on the recommendations, and
   display the visual representation of the secondary access channel to the user to show the user what the recommended secondary access channel would look like.

13. The system of claim 1, where, when configuring the secondary access channel based on the defined user experience for the secondary access channel, the defined portal for the secondary access channel, and the defined content management for the secondary access channel such that the set of one or more different devices access the secondary access channel, the at least one processor is further to:
   configure the secondary access channel based on the defined user experience for the secondary access channel, the defined portal for the secondary access channel, and the defined content management for the secondary access channel such that the set of one or more different devices access the secondary access channel independently of accessing the primary access channel.

14. A method, comprising:
   determining whether to define a new secondary access channel based on an existing primary access channel, the primary access channel being configured to be accessed by a set of one or more device types and the secondary access channel being configured to be accessed by a set of one or more different device types;
   in response to a determination to define the new secondary access channel based on the existing primary access channel, accessing, by a computer system, data defining a user experience that includes multiple user experience attributes, a portal that includes multiple portlets, and content management that includes a content management attribute, for the primary access channel;
   determining characteristics of the set of one or more different device types to access the secondary access channel;
   identifying aspects of the user experience, the portal, and the content management for the primary access channel as either appropriate for the secondary access channel or inappropriate for the secondary access channel based on applying a set of stored mapping rules to the characteristics of the set of one or more different device types to access the secondary access channel and the data defining the user experience, the portal, and the content management for the primary access channel;
   automatically determining, by the computer system, multiple recommendations for migrating the primary access channel to the secondary access channel based on the aspects of the user experience, the portal, and the content management for the primary access channel that are identified as inappropriate for the secondary access channel, where each of the multiple recommendations indicates one or more of that a particular user experience attribute included in the user experience of the primary access channel is inappropriate for the secondary access channel, that a particular portlet of the portal of the primary access channel is inappropriate for the secondary access channel, or that a particular content management attribute of the primary access channel is inappropriate for the secondary access channel;
   outputting, by the computer system, on a display the multiple recommendations for migrating the primary access channel to the secondary access channel to assist in defining the secondary access channel;
   receiving a user input indicating which of the multiples recommendations output on the display are accepted by the user;
   in response to the receipt of the user input indicating which of the multiples recommendations output on the display are accepted by the user, defining, by the computer system and based at least on the user input, a user experience for the secondary access channel based at least on the user input and to enable mapping of the user experience defined for the primary access channel to the user experience for the secondary access channel and to adapt the user experience for the secondary access channel to the characteristics of the set of one or more different device types to access the secondary access channel;
   defining, by the computer system and based at least on the user input, a portal for the secondary access channel using one or more pre-configured portal components;
   defining, by the computer system and based at least on the user input, content management for the secondary access channel using one or more pre-configured content management components that leverage content developed for the primary access channel and that customize presentation of the content for the secondary access channel; and
   configuring, by the computer system, the secondary access channel based on the defined user experience for the secondary access channel, the defined portal for the secondary access channel, and the defined content management for the secondary access channel such that the set of one or more different devices access the secondary access channel.

15. A non-transitory computer-readable medium storing instructions, the instructions comprising:
   one or more instructions that, when executed by one or more processors of a device, cause the one or more processors to:
   determining whether to define a new secondary access channel based on an existing primary access channel, the primary access channel being configured to be accessed by a set of one or more device types and the secondary access channel being configured to be accessed by a set of one or more different device types;
   in response to a determination to define the new secondary access channel based on the existing primary access channel, accessing, by a computer system, data defining a user experience that includes multiple user experience attributes, a portal that includes multiple portlets, and content management that includes a content management attribute, for the primary access channel;
   determining characteristics of the set of one or more different device types to access the secondary access channel;
   identifying aspects of the user experience, the portal, and the content management for the primary access channel as either appropriate for the secondary access channel or inappropriate for the secondary access channel based on applying a set of stored mapping rules to the characteristics of the set of one or more different device types to access the secondary access channel and the data defining the user experience, the portal, and the content management for the primary access channel;
   automatically determining, by the computer system, multiple recommendations for migrating the primary access channel to the secondary access channel based on the aspects of the user experience, the portal, and the content management for the primary access channel that are identified as inappropriate for the secondary access channel, where each of the multiple recommendations indicates one or more of that a particular user experience attribute included in the user experience of the primary access channel is inappropriate for the secondary access channel, that a particular portlet of the portal of the primary access channel is inappropriate for the secondary access channel, or that a particular content management attribute of the primary access channel is inappropriate for the secondary access channel;

outputting, by the computer system, on a display the multiple recommendations for migrating the primary access channel to the secondary access channel to assist in defining the secondary access channel;

receiving a user input indicating which of the multiples recommendations output on the display are accepted by the user;

in response to the receipt of the user input indicating which of the multiples recommendations output on the display are accepted by the user, defining, by the computer system and based at least on the user input, a user experience for the secondary access channel based at least on the user input and to enable mapping of the user experience defined for the primary access channel to the user experience for the secondary access channel and to adapt the user experience for the secondary access channel to the characteristics of the set of one or more different device types to access the secondary access channel;

defining, by the computer system and based at least on the user input, a portal for the secondary access channel using one or more pre-configured portal components;

defining, by the computer system and based at least on the user input, content management for the secondary access channel using one or more pre-configured content management components that leverage content developed for the primary access channel and that customize presentation of the content for the secondary access channel; and configuring, by the computer system, the secondary access channel based on the defined user experience for the secondary access channel, the defined portal for the secondary access channel, and the defined content management for the secondary access channel such that the set of one or more different devices access the secondary access channel.

\* \* \* \* \*